United States Patent
Nomen Calvet et al.

(10) Patent No.: US 11,209,217 B2
(45) Date of Patent: Dec. 28, 2021

(54) MECHANICAL VAPOUR COMPRESSION ARRANGEMENT HAVING A LOW COMPRESSION RATIO

(71) Applicants: WGA WATER GLOBAL ACCESS S.L., Sispony (AD); Juan Eusebio Nomen Calvet, L'Aldosa (AD); Dan Alexandru Hanganu, Barcelona (ES)

(72) Inventors: Juan Eusebio Nomen Calvet, L'Aldosa (AD); Dan Alexandru Hanganu, Barcelona (ES)

(73) Assignee: WGA WATER GLOBAL ACCESS S.L., Sispony (AD)

( * ) Notice: Subject to any disclaimer, the term of this patent is extended or adjusted under 35 U.S.C. 154(b) by 0 days.

(21) Appl. No.: 16/770,511

(22) PCT Filed: Dec. 4, 2018

(86) PCT No.: PCT/ES2018/070782
§ 371 (c)(1),
(2) Date: Jun. 5, 2020

(87) PCT Pub. No.: WO2019/110862
PCT Pub. Date: Jun. 13, 2019

(65) Prior Publication Data
US 2021/0162313 A1 Jun. 3, 2021

(30) Foreign Application Priority Data

Dec. 5, 2017 (ES) ................................ ES201731494
Dec. 13, 2017 (ES) ................................ ES201731521
Dec. 4, 2018 (WO) .................. PCT/ES2018/070781

(51) Int. Cl.
*B01D 1/20* (2006.01)
*C02F 1/04* (2006.01)
(Continued)

(52) U.S. Cl.
CPC ............. *F28D 15/046* (2013.01); *B01D 1/20* (2013.01); *B01D 1/28* (2013.01); *B01D 5/0003* (2013.01);
(Continued)

(58) Field of Classification Search
CPC ........ B01D 1/28; B01D 5/0003; B01D 5/006; B01D 5/0075; C02F 1/041; F28D 15/0233; F28D 15/046
See application file for complete search history.

(56) References Cited

U.S. PATENT DOCUMENTS 3,305,454 A * 2/1967 Cowley .................... B01D 3/10
202/205
6,951,243 B2 * 10/2005 Nilson .................. F28D 15/043
165/104.21
(Continued)

FOREIGN PATENT DOCUMENTS

CN        206481096 U     9/2017
JP        2013088049 A    5/2013

OTHER PUBLICATIONS

PCT/ES2018/070782 Interntional Search Report completed Apr. 15, 2019.

*Primary Examiner* — Jonathan Miller
(74) *Attorney, Agent, or Firm* — Brooks Kushman P.C.

(57) ABSTRACT

The invention relates to a mechanical vapour compression (MVC) desalination arrangement having a low compression ratio, with latent-heat exchangers having a high latent-heat exchange coefficient, with a temperature gradient between primary vapour and secondary vapour of approximately 1° C. or less, a compression ratio of 1.11 or less, high vapour volume, low overheating and a low-temperature saline solution to be desalinated, which arrangement allows industrial desalination with less specific energy per unit of desalinated (Continued)

water and is coupled to 100% renewable off-grid energy sources.

5 Claims, 2 Drawing Sheets

(51) Int. Cl.
  *F28D 15/04* (2006.01)
  *B01D 5/00* (2006.01)
  *F28D 15/02* (2006.01)
  *B01D 1/28* (2006.01)
  *C02F 103/08* (2006.01)

(52) U.S. Cl.
  CPC ........... *B01D 5/006* (2013.01); *B01D 5/0075* (2013.01); *C02F 1/041* (2013.01); *C02F 1/048* (2013.01); *F28D 15/0233* (2013.01); *C02F 2103/08* (2013.01)

(56) References Cited

U.S. PATENT DOCUMENTS

| | | | |
|---|---|---|---|
| 7,251,944 B2* | 8/2007 | Holtzapple | B01D 1/0058 62/333 |
| 10,390,500 B2* | 8/2019 | Brant | B01D 71/38 |
| 10,399,003 B2* | 9/2019 | Antar | B01D 1/02 |
| 2005/0081552 A1* | 4/2005 | Nilson | F28D 15/043 62/311 |
| 2006/0225863 A1 | 10/2006 | Levin | |
| 2007/0246193 A1* | 10/2007 | Bhatti | H01L 23/427 165/104.21 |
| 2008/0083605 A1* | 4/2008 | Holtzapple | C02F 1/66 203/11 |
| 2011/0056822 A1* | 3/2011 | Elsharqawy | C02F 1/12 203/11 |
| 2017/0030656 A1 | 2/2017 | Lien et al. | |
| 2017/0150685 A1* | 6/2017 | Brant | B01D 65/08 |
| 2019/0240592 A1* | 8/2019 | Antar | C02F 1/12 |
| 2019/0301808 A1* | 10/2019 | Holtzapple | F28D 7/16 |
| 2020/0339439 A1* | 10/2020 | Dermitzakis | B01D 1/2887 |

\* cited by examiner

MECHANICAL VAPOUR COMPRESSION ARRANGEMENT HAVING A LOW COMPRESSION RATIO

OBJECT

The present invention relates to a mechanical vapour compression (MVC) desalination arrangement having a low compression ratio.

STATE OF THE ART

Desalination devices through mechanical vapour compression MVC or mechanical vapour recompression MVR are based on the transformation of kinetic energy into compression work of the primary vapour, to achieve an increase in pressure and temperature of the secondary vapour. The secondary vapour leaves the compressor and condenses on the condensing wall of a latent heat exchanger, releasing latent condensation heat that passes through the wall of the latent heat exchanger and is transformed into latent evaporation heat on the evaporating face generating primary vapour that it is reintroduced into the compressor to generate new secondary vapour. So an MVC is a device that recycles practically all the latent heat and the energy it consumes is basically mechanical energy to move the vapour compressor. This mechanical energy is a small fraction of the enthalpy recycled into the vapour.

One problem with current MVC devices is that they use thin liquid film latent heat exchangers. The latent heat exchange coefficient of current thin liquid film heat exchangers is around 2,000 W/m$^2$K, reaching 6,000 W/m$^2$K in vertical configurations.

This limited latent heat exchange coefficient means that current MVCs require a high temperature gradient, thermal rise between the primary and the secondary vapour. This temperature differential is multiplied in case of multi-effect MED-MVC configurations. The state-of-the-art MVC devices are configured with temperature differentials or thermal gradients between primary vapour and secondary vapour of around 5° C. per effect, or more. The compression ratio, quotient between the pressure of the generated vapour and the pressure of the intake vapour, for a 5 degree gradient is around 1.3, that is, above 1.2. For this reason, MVCs are equipped with compressors that, by definition, have compression ratios of 1.2 or more, whereas fans only reach compression ratios of 1.11 and blowers have compression ratios between 1.11 and 1.2. The higher the temperature gradient between the primary vapour and the secondary vapour, the greater the pressure difference between the primary vapour that feeds the mechanical compressor and the secondary vapour that must leave the compressor. Thus, the needed mechanical vapour compressor used requires a higher compression ratio. Increasing the compression ratio of a mechanical compressor results in a more complex design of the compressor, a higher capital expenditure, a higher maintenance complexity and higher energy consumption.

In the state of the art, there are high thermal efficiency heat exchange tubes based on condensation and capillary evaporation, with microgrooves on the evaporating and condensing faces that permit to increase the latent heat transfer coefficient above the current paradigm of the thin liquid film heat exchangers that are around 2,000 W/m$^2$K. The elevation of the latent heat transfer coefficient reduces the temperature gradient between the condensing face and the evaporating face of the latent heat exchanger. The temperature gradient can be reduced to differentials around 1° C. per effect.

Another problem of the current MVCs is that, since they need compression ratios greater than 1.2, they need to incorporate vapour compressors and cannot work with blowers or fans, and the compressors have low flow rates, which limits the distilled water production capacity of current state-of-the-art MVCs due to the relatively low vapour flow that they can manage.

Another problem of the current MVCs is the overheating of the secondary vapour, that is to say that the mechanical compression of the vapour causes a rise in the temperature of the saturated vapour above the equilibrium temperature between temperature and pressure. This overheating of the vapour is multiplied by the increase in the pressure gradient needed to be achieved between the primary vapour and the secondary vapour. The overheating requires a process of elimination and involves an energy cost.

Another problem with current MVCs is the increase of the temperature of the primary vapour to reach a sufficient density to achieve sufficient levels of efficiency of the mechanical compressor by making better use of the limited volume flow rate of compressors having a high compression ratio. The working temperature of the primary vapour is usually between 50° C. and 65° C. The requirement of raising the working temperature of the primary vapour involves energy consumption and increases the thermal insulation requirements of the installation.

SUMMARY

The present invention seeks to solve one or more of the problems set forth above, increase the desalination capacity and reduce the specific energy cost per unit of desalinated water by means of MVC desalination arrangement having a low compression ratio as defined in the claims.

The new MVC desalination arrangement having a low compression ratio has the following differentiating features:
- The incorporation of high-efficiency latent heat exchangers with high latent heat exchange coefficients through capillary evaporation and condensation so that the thermal rise is around 1° C., or less, per effect, instead of the thermal gradient around 5° C., or more, per effect in the case of the current MVCs.
- This reduction in temperature differential between primary vapour and secondary vapour and the corresponding reduction in pressure difference between primary vapour and secondary vapour lead to a reduction of the compression ratio below 1.11.
- The reduction of the pressure differential permits the reduction of the work input to the system, that is, a reduction of the specific consumption of energy per unit of condensed water.
- The reduction of the compression ratio below 1.11 permits to replace the compressor of the MVC arrangements of the state of the art by a fan, which is a mechanical device requiring lower capital expenditure and lower maintenance cost than a compressor.
- The incorporation of a fan permits to achieve much higher flow rates than a compressor, which allows to multiple the amount of desalinated water in relation to state-of-the-art MVCs equipped with compressors.
- The MVC desalination arrangement having a low compression ratio can work with reduced temperatures of the primary vapour as it does not have the vapour density requirements derived from the flow limitations imposed by a compressor. So the temperature of the primary vapour can drop to temperatures close or equal to the ambient temperature of the saline solution to be desalinated, reducing or eliminating the energy input needed to increase the working temperature of the primary vapour.

The reduction of the pressure differential between primary vapour and secondary vapour lowers the overheating effect of the secondary vapour, with the corresponding energy savings.

The recycling process of practically all the primary vapour, typical of an MVC arrangement, is achieved with a lower energy supply than that required in a state-of-the-art MVC, thus reducing the fraction of mechanical energy provided to recycle a large enthalpy. For this reason, the specific consumption per unit of desalinated water is at levels relatively close to the theoretical minimum.

Thus, the MVC desalination arrangement having a low compression ratio permits to achieve the lowest specific energy consumption per unit of desalinated water from among industrial desalination systems.

The low specific energy consumption of the desalination plant having a low compression ratio allows it to be coupled to a 100% renewable, off-grid energy source, such as wind, photovoltaic or marine energy sources.

A modular system consisting of more than one desalination plant can be made, each one with dimensions following a minmax formulation in which costs are minimized and benefits are maximized, to build desalination plants of greater capacity than a single desalination arrangement.

BRIEF DESCRIPTION OF THE FIGURES

A more detailed explanation of the invention is given in the description that follows and which is based on the attached figures.

DESCRIPTION

Figure 1:
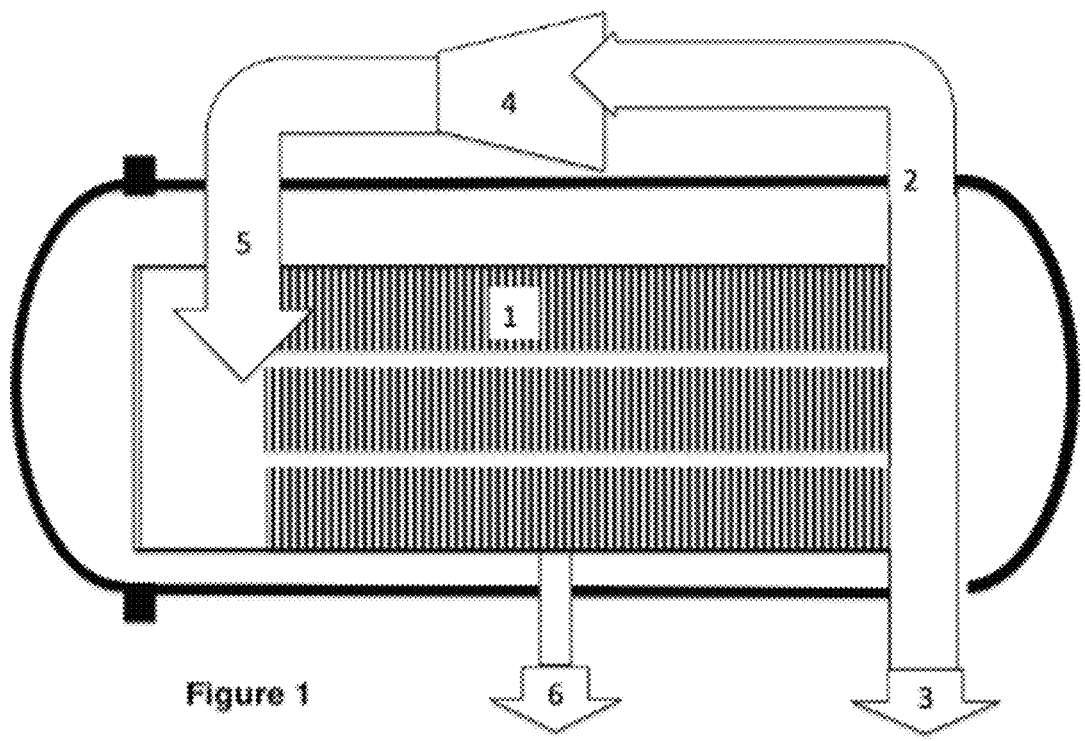
FIG. 1 shows a longitudinal section of a state-of-the-art MVC device with a compressor.

FIG. 1 shows a diagram of a state-of-the-art mechanical vapour compression desalination plant having a tube or chamber latent heat exchanger 1 with addition of saline solution on the evaporating face in a descending or ascending thin film process. The state-of-the-art MVC can be horizontally or vertically arranged. The state-of-the-art MVC has a vapour compressor 4 that receives primary vapour 2 from the evaporating face of the latent heat exchanger 1. The compressor 4 raises the pressure of the primary vapour 2 generating the secondary vapour 5.

The secondary vapour 5 is supplied to the condensing face of the exchanger 1 where it condenses and the condensed water 6 is drawn from the device. By condensing the secondary vapour on the condensing face of the heat exchanger, the latent heat is released and this energy is transmitted through the wall of the latent heat exchanger to the evaporating face where the energy is transformed into latent heat by evaporating part of the saline solution provided on the evaporating face producing a brine 3 that is extracted from the device and new primary vapour 2 that is reintroduced into the compressor 4, restarting a new cycle.

The saline solution flows on the evaporating face of the heat exchanger 1 in the form of a thin liquid film. The thermal resistances of the water layers limit the aggregate latent heat transfer coefficient of the state-of-the-art latent heat exchanger wall, which is around 2,000 W/m$^2$K, and can reach coefficients of about 6,000 W/m$^2$K in vertical arrangements. The thermal resistances imposed by the water layers require a differential or temperature gradient of around 5° C., or more, by effect. There are state-of-the-art MVC devices with more than one effect.

The secondary vapour 5 experiences a phenomenon called overheating as a result of the compression process. The temperature of the primary vapour increases above the equilibrium temperature in relation to its pressure. This implies the need to incorporate a desuperheater at the outlet of the condenser 4; to eliminate this overheating and the corresponding loss of energy.

The MVC devices of the state of the art usually work at a primary vapour temperature between 55° C. and 65° C. to have vapour with the highest possible density, without exceeding 70° C. in the secondary vapour in order to avoid precipitation of salts.

Figure 3:
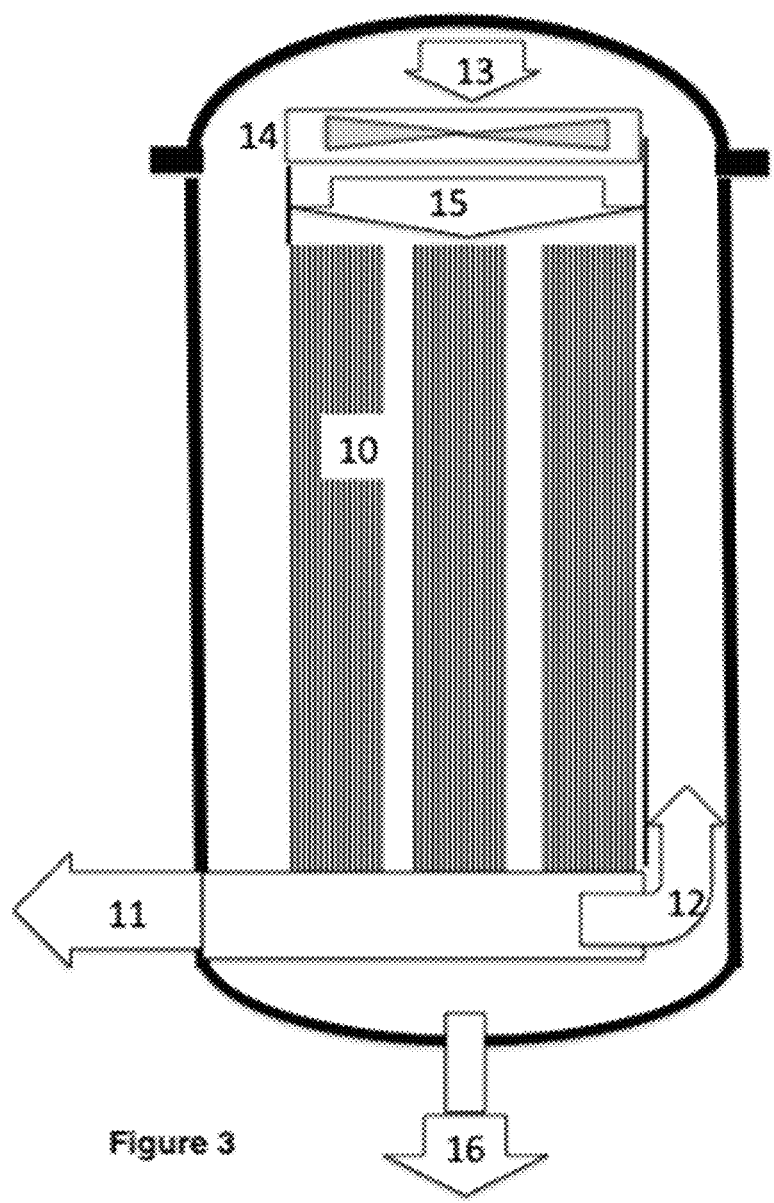
FIG. 3 shows a longitudinal section of a MVC desalination arrangement having a low compression ratio with a fan.

FIG. 3 shows a MVC desalination plant having a low compression ratio. It can adopt a vertical configuration as in FIG. 3 or a horizontal configuration. The MVC desalination arrangement having a low compression ratio has the following specific characteristics, which differentiate it from a state-of-the-art MVC arrangement:

It is a shell and tubes or chambers device that works in subatmospheric conditions and the latent heat exchanger 10 is made up of evaporator-condenser tubes or chambers having the following configuration:

The condensing face of these tubes or chambers is covered, at least in part, with microgrooves or another capillary structure on which the water vapour condenses in a capillary condensation regime. The section, inclination and length of these microgrooves or other capillary structure are selected in such a way that, taking into account the energy flow and the rate of condensation, the condensed water flows into the capillary structures and leaves a space free of water layers between the end of the meniscus 8 and the end of the microgroove or other capillary structure.

The evaporating face of these tubes or chambers is covered, at least in part, by microgrooves or micro undulations on which evaporation occurs from the end of the menisci 7 of the saline solution that flows within the microgrooves or micro undulations. The section, inclination and length of these microgrooves and the flow of saline solution provided within the microgrooves or micro undulations are selected in such a way that, taking into account the energy flow and the rate of evaporation, the flow of saline solution does not dry along these microgrooves or micro undulations and there is a gap free of water layers between the end of the meniscus 7 and the end of the microgroove or micro undulations.

Figure 2:
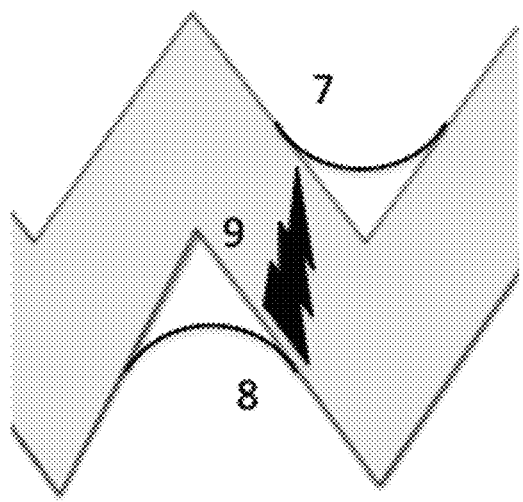
FIG. 2 shows a zigzag section of an evaporating condensing chamber with microgrooves.

As shown in FIG. 2, the wall section in one configuration of these evaporator-condenser tubes or chambers 10 adopts the shape of a continuous, zigzag, crenellated or corrugated continuous line. Thus, the thermal path 9 is free of water layers between the capillary condensation point on the condensed water menisci 8 that form on the condensing face and the upper end of the saline solution meniscus 7 where evaporation occurs on the evaporating face. So the energy is transmitted without passing through layers of liquid.

The supply of the saline solution on the evaporating face of the evaporator-condenser tubes or chambers of the latent heat exchanger is carried out within the microgrooves or micro undulations on the evaporating face. This supply of saline solution is not carried out in a descending water layer regime, so that the thermal resistance of these water layers does not occur on the wall of the latent heat exchanger. The reduction or elimination of the thermal barriers of water layers and the thermal efficiency of the capillary condensation and evaporation of the desalination arrangement allow the aggregate coefficient of latent heat transfer of the wall of the latent heat exchanger to be very high. The latent heat transfer coefficient of the latent heat exchangers 10 of the desalination arrangement 25 can exceed 40,000 W/m$^2$K The high latent heat transfer coefficient of the condenser-evaporator tubes or chambers of the latent heat exchanger 10 allows the MVC desalination arrangement having a low compression ratio to require a differential or temperature gradient between primary vapour and secondary vapour only between 0.8° C. and 0.2° C. plus the temperature differential related to the boiling point elevation of the saline solution. For seawater, the temperature differential related to the boiling point elevation is around 0.5° C., so that the temperature differential between primary vapour and secondary vapour with the desalination arrangement is low, and range between 1.3° C. and 0.7° C., or less, that is, a temperature differential of around 1° C., or less.

The desalination arrangement dedicates the reduction of the thermal gradient between primary vapour and secondary vapour to reduce the pressure differential between primary vapour and secondary vapour, which implies reducing the compression ratio between secondary vapour and primary vapour to levels below 1.11.

The reduction of the compression ratio below 1.11 implies a reduced need for work input to compress the vapour and reduces the specific energy consumption per unit of desalinated water.

The reduction of the compression ratio to levels below 1.11 is also used to eliminate the compressor 4 from the arrangements of the state of the art and to introduce a low compression fan-type device 14. A fan has a lower capital cost and a lower operating cost than a compressor, and fans can move much greater volumetric flows than compressors, so the cost of a fan is much lower than the cost of a compressor per unit of mass flow, and the fans allow arrangements with higher production capacity than compressors.

The primary vapour 12 generated on the evaporating face of the heat exchanger 10 is channeled to the inlet 13 of the fan 14 where the vapour pressure is increased, generating the secondary vapour 15 that is supplied on the condensing face of the heat exchanger 10 with high latent heat transfer coefficient.

The fan 14 may be configured to produce a small increase in pressure. An important advantage of using a fan 14 versus using a compressor 4 is that the fan 14 does not have the flow limitations of a compressor, so that the MVC desalination arrangement having a low compression ratio can be configured to increase the pressure to high vapour flow rates, which allows high distilled water production capacities.

The fan 14 does not have the vapour density requirements derived from the flow limitations imposed by a compressor. For this reason, it can work without the need to increase the temperature of the saline solution supplied to the evaporating face to temperatures close to 65° C., as in the case of the MVCs of the state of the art which need to be supplied a primary vapour at a temperature of about 65° C. with the corresponding high density. The fan 14 can operate at temperatures equal or similar to the ambient temperature of the water to be desalinated, with the corresponding energy savings.

The low compression ratio of the fan 14, below 1.11, supposes superheating levels lower than those produced by compressors with compression ratios higher than 1.2, with the corresponding energy savings.

Given the high latent heat transfer coefficient of latent heat exchange plates or tubes, an embodiment of the MVC desalination arrangement having a low compression ratio can be designed with a temperature gradient between the primary vapour and the secondary vapour of 0.7° C., or less. In this case, the compression ratio decreases to 1.06, or less, and the specific energy consumption decreases so that the energy input to the MVC desalination arrangement having a low compression ratio reaches the lowest levels per unit of desalinated water from among all industrial desalination devices, with the added advantage that this energy can be provided entirely by a renewable source, off-grid, that is, with a practically zero impact on the $CO_2$ footprint, which entails a paradigm shift in the world of desalination and allows communities with few energy and economic resources to access safe water.

The fan 14 can be placed inside the casing as shown in FIG. 3 or can be placed in a separate casing, connected by ducts.

The MVC desalination arrangement having a low compression ratio can be used to desalinate seawater, brackish water or other types of saline solutions.

The MVC desalination arrangement having a low compression ratio can be implemented in a modular configuration formed by more than one desalination arrangement, each of dimensions following a minmax formulation in which costs are minimized and benefits are maximized, to form desalination plants with greater capacity than a single desalination arrangement, to provide high productions and with grid connection. The MVC desalination arrangement having a low compression ratio can be implemented under a low cost configuration designed for communities in remote areas or low resources and can work 100% from renewable energy, off-grid.

The invention claimed is:

1. Desalination system for mechanical compression of vapour (MVC) having a low compression ratio, wherein the system comprises:
   a latent heat exchanger including at least an evaporator-condenser tube or chamber having an evaporating face covered, at least in part, by a structure through which a saline solution flows forming menisci and water vapor evaporates from the end of the menisci, and having a condensing face covered, at least in part, by microgrooves or a capillary structure on which water vapour condenses in a capillary condensation regime forming menisci, a thermal path is formed between the point of release of the condensation latent heat and the point of absorption of the evaporation latent heat and such thermal path is free from water layers, the latent heat exchanger is configured to have a high global aggregate coefficient of latent heat transfer that allows a condensation and evaporation cycle to be performed with a thermal rise between primary vapour and secondary vapour between 0.5° C. and 0.8° C., or less, plus the elevation related to the boiling point of the saline solution, the compression ratio between the secondary vapour and the primary vapour is equal to or less than 1.11;

at least one fan with a compression ratio equal to or less than 1.11, configured to draw the primary vapour from the evaporating face of the heat exchanger and increase the temperature and pressure of the primary vapour to generate the secondary vapour that is supplied to the condensing face of the latent heat exchanger.

2. Desalination system according to claim 1, wherein the saline solution to be desalinated is supplied to the evaporating face of the latent heat exchanger at a temperature equal or similar to a room temperature.

3. Desalination system according to claim 1, wherein the arrangement comprises more than one condenser-evaporator effect or cycle arranged between the primary vapour and the secondary vapour.

4. Desalination system according to claim 1, wherein the at least one fan is powered by a renewable low intensity energy source including wind, photovoltaic or marine energy.

5. Desalination system according to claim 1, wherein the saline solution provided on the evaporating face of the heat exchanger is a saline solution other than sea water or brackish water.

* * * * *